(12) United States Patent
Ratican

(10) Patent No.: US 6,318,747 B1
(45) Date of Patent: Nov. 20, 2001

(54) APPARATUS AND METHODS FOR ALIGNING TRAILER HITCH COMPONENTS

(76) Inventor: Christopher Ratican, 803 S. Indian River Dr., Ft. Pierce, FL (US) 34950

( * ) Notice: Subject to any disclaimer, the term of this patent is extended or adjusted under 35 U.S.C. 154(b) by 0 days.

(21) Appl. No.: 09/358,194

(22) Filed: Jul. 21, 1999

Related U.S. Application Data

(63) Continuation-in-part of application No. 09/096,032, filed on Jun. 11, 1998.
(60) Provisional application No. 60/058,514, filed on Sep. 11, 1997.

(51) Int. Cl.[7] ........................................................ B60D 1/40
(52) U.S. Cl. ............................ 280/477; 33/264; 116/28 R
(58) Field of Search ............................... 280/477; 33/264, 33/386; 116/28 R; 343/715, 888

(56) References Cited

U.S. PATENT DOCUMENTS

| | | | |
|---|---|---|---|
| 2,984,011 | * | 5/1961 | Hamilton . |
| 3,774,149 | * | 11/1973 | Bennett ................................. 340/431 |
| 3,818,599 | * | 6/1974 | Tague ..................................... 33/264 |
| 3,889,384 | * | 6/1975 | White ..................................... 33/264 |
| 3,918,746 | * | 11/1975 | Lehtisaari ............................. 280/477 |
| 4,054,302 | * | 10/1977 | Campbell ............................. 280/477 |
| 4,285,138 | * | 8/1981 | Berry ..................................... 33/264 |
| 4,583,481 | * | 4/1986 | Garrison .............................. 116/28 R |
| 4,621,432 | * | 11/1986 | Law ........................................ 33/264 |
| 4,666,176 | * | 5/1987 | Sand ..................................... 280/477 |
| 4,856,200 | * | 8/1989 | Riggs ..................................... 33/264 |
| 5,036,593 | * | 8/1991 | Collier ................................... 33/264 |
| 5,113,588 | * | 5/1992 | Walston ................................ 33/264 |
| 5,224,270 | * | 7/1993 | Burrus ................................... 33/264 |
| 5,328,199 | * | 7/1994 | Howe .................................. 280/477 |
| 5,478,101 | * | 12/1995 | Roberson ............................ 280/477 |
| 5,558,352 | * | 9/1996 | Mills .................................... 280/477 |
| 5,927,229 | * | 7/1999 | Karr, Jr. .............................. 116/28 R |

* cited by examiner

Primary Examiner—Kevin Hurley
(74) Attorney, Agent, or Firm—Armstrong Teasdale LLP

(57) ABSTRACT

Apparatus and methods especially useful for the alignment of trailer hitch components by an unaided individual are described. In one embodiment, the apparatus includes a visual guide attached to the top of a mast which is mounted in an angularly adjustable mast mount on the winch strut of a trailer, and a target mounted on the rear of a towing vehicle, visible to the driver. The position of the visual guide is pre-adjusted so the visual guide strikes or nearly strikes the target on the towing vehicle when the trailer hitch components are aligned. The target and mast are then removed, or placed in a stowed position for towing. When alignment is again desired the target, mast and mast mount are returned to the pre-adjusted position, and the driver of the towing vehicle uses the pre-adjusted position of the visual guide to guide maneuvering of the towing vehicle to align the trailer hitch components.

11 Claims, 5 Drawing Sheets

APPARATUS AND METHODS FOR ALIGNING TRAILER HITCH COMPONENTS

This application is a continuation in part of application Ser. No. 09/096,032, filed Jun. 11, 1998, incorporated herein by reference and claims benifit of provisional application Ser. No. 60/058,514 filed Sep. 11, 1997.

BACKGROUND OF THE INVENTION

This invention relates generally to aligning the towing hitch components on a towing vehicle and on that which is being towed, and more particularly to methods and apparatus for facilitating such alignment.

A driver of a motor vehicle often has difficulty in aligning the trailer hitch component on the rear of the towing vehicle with the trailer hitch component on the vehicle or trailer to be towed. The driver typically relies on a second individual to direct the alignment from outside the towing vehicle or completes the alignment manually. Particularly, an individual driver attempting such an alignment is faced with the frustration of attempting alignment while in the driver's seat and unable to directly view the hitch components. Such a task may involve repeated exits and reentries from the towing vehicle to view the alignment of the hitch components and adjust the position of the towing vehicle accordingly. This is a cumbersome process which is especially daunting for individuals of limited mobility who find repeated exits and entries of the towing vehicle to be difficult and uncomfortable. There is also the risk of backing the towing vehicle directly into the trailer and causing considerable damage.

Typically, and with smaller trailers such as trailers for boats less than twenty feet in length, the user manually completes the final alignment. Specifically, once the towing vehicle has been aligned as close as possible to the trailer, the user will move the tongue of the trailer at least a couple of inches and onto the towing vehicle hitch. For a disabled user, such final manual alignment can be very difficult to complete. In addition, and with larger trailers such as camping trailers and large boat trailers, such manual final alignment is not possible due to the weight of trailing vehicle.

Known devices to aid the individual driver in the alignment of trailer hitch components include flags which are visible to the driver from the driver's seat of the towing vehicle and provide direction for alignment. These devices offer attractive alternatives to unaided trailer hitch alignment, but such devices also have some limitations. For example, many of the known devices do not provide a visible confirmation of the proper alignment of the hitch components on the towing vehicle and the trailer, and there is no visible reference for proper relative positioning of the towing vehicle trailer hitch component. Other known devices which provide a visible reference, for example with a telescoping rod, can be inconvenient to use because they are not easily dissembled and stored, and must be realigned each time the rod is remounted on the trailer. In addition, some known devices are not easily practicable in the dark (e.g., at night on a boat ramp) because the alignment aid is not visible.

It would be desirable to provide a simple trailer hitch alignment apparatus to aid an individual driver in aligning trailer hitch components. It would also be desirable to provide such an apparatus which is easily dismounted, stored and remounted with little or no readjustment required. It would also be desirable to provide such an apparatus which is adjustable to suit a variety of towing vehicle and trailer hitch configurations and which is easily practicable in the dark. It would be further desirable to provide such an apparatus which is adjustable for aiding alignment of an object to be towed with the towing trailer.

BRIEF SUMMARY OF THE INVENTION

These and other objects may be attained by apparatus and methods for aligning the trailer hitch components of a towing vehicle and a trailer. The apparatus generally includes an adjustable mast removably mounted to an angularly adjustable mast mount, and a target. The mast generally includes multiple telescoping portions so that the length of the mast is adjustable, a mounting portion coupled to one end, and a visual guide such as a light or brightly colored tip coupled to the other end. The mast mount includes a base for securing the mast mount to the towed or towing vehicle, and an angularly adjustable portion including a post which is received in a socket in the mounting portion of the mast. The target generally includes a transparent target plate hingedly coupled to a magnetic base so that the target is easily positioned and mounted on the towing vehicle or trailer.

In use and in one specific embodiment of the method, the driver first preadjusts the apparatus when the trailer hitch components are aligned. For example, the driver mounts the target on the rear or other part of the towing vehicle which is visible to the driver, for example on the rear window. The driver secures the mast mount at its base to the winch strut of the trailer. The driver then mounts the mast by its socket on the angularly adjustable portion of the mast mount. The angularly adjustable post is then adjusted so that the visual guide attached to the end of the mast strikes the target plate. The angular position of the angularly adjustable post and the target are then marked, and the mast and target are removed for travel.

When re-alignment of the trailer hitch components is desired, the driver need merely re-mount the mast on the mast mount. The visual guide on the mast end then directs the driver from the driver's seat of the towing vehicle while the driver maneuvers the hitch components into alignment. More specifically, when the visual guide on the mast end strikes the target plate mounted on the vehicle, the driver then knows, without exiting the towing vehicle, that the trailer hitch components are in the alignment as determined during pre-adjustment of the apparatus.

The above described hitch alignment apparatus is simple and provides an aid for an individual driver in aligning trailer hitch components. Such apparatus also is adjustable to accommodate a variety of towing vehicle and trailer hitch configurations and is practicable for use in the dark. Further, the apparatus is easily dissembled or removed so that it can be packed or stowed.

DETAILED DESCRIPTION OF THE INVENTION

The present invention is directed to apparatus and methods for aiding an individual in loading onto a trailer an object to be towed, and in aligning the trailer hitch components. Although specific embodiments of the apparatus and methods are described below, many variations and alternatives are possible. Further, the term trailer as used herein refers to anything towable such as a boat or motorcycle trailer, or a camper.

Figure 1:
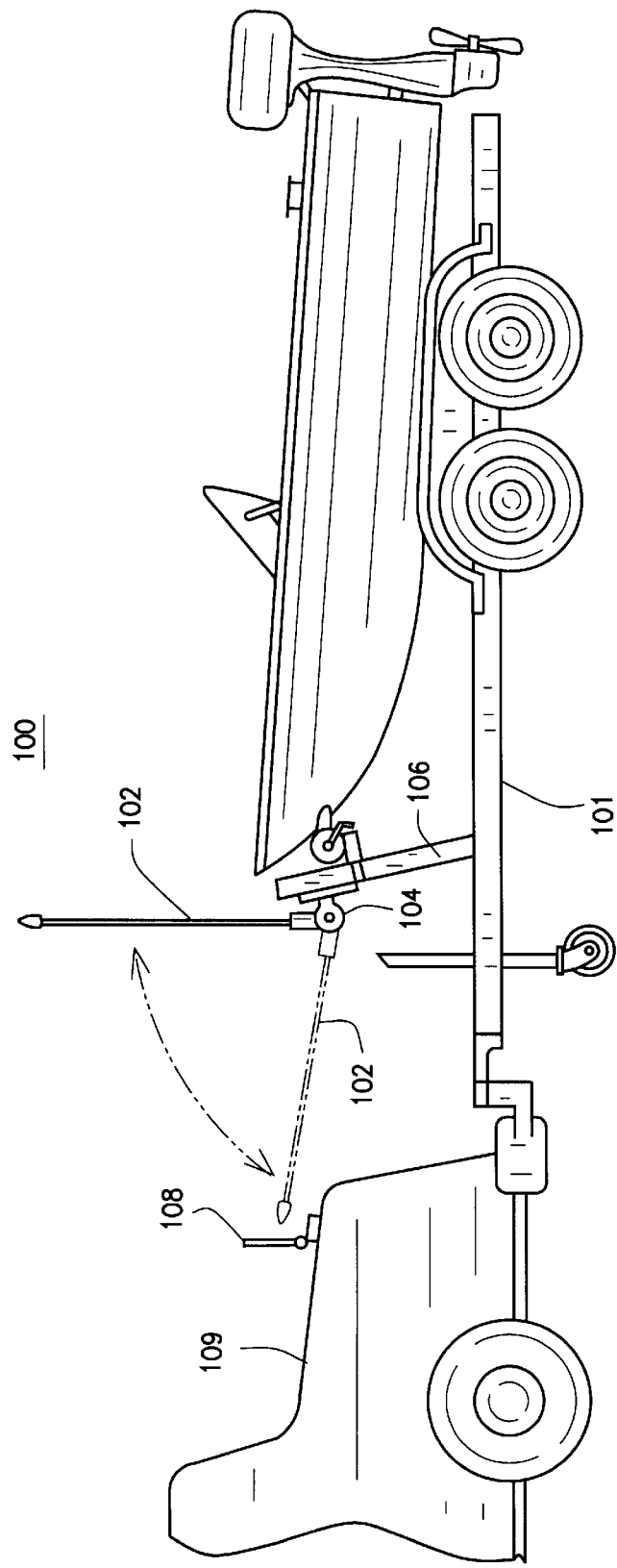
FIG. 1 is a schematic illustration of apparatus for the alignment of trailer hitch components.

Referring specifically to the drawings, FIG. 1 is a schematic view of an apparatus 100 for the alignment of trailer hitch components by an unaided individual. In one embodiment, apparatus 100 includes a mast 102 coupled to an angularly adjustable mast mount 104 which is mounted on a trailer winch strut 106, and an alignment target 108 mounted on the rear of a towing vehicle 109.

Figure 2:
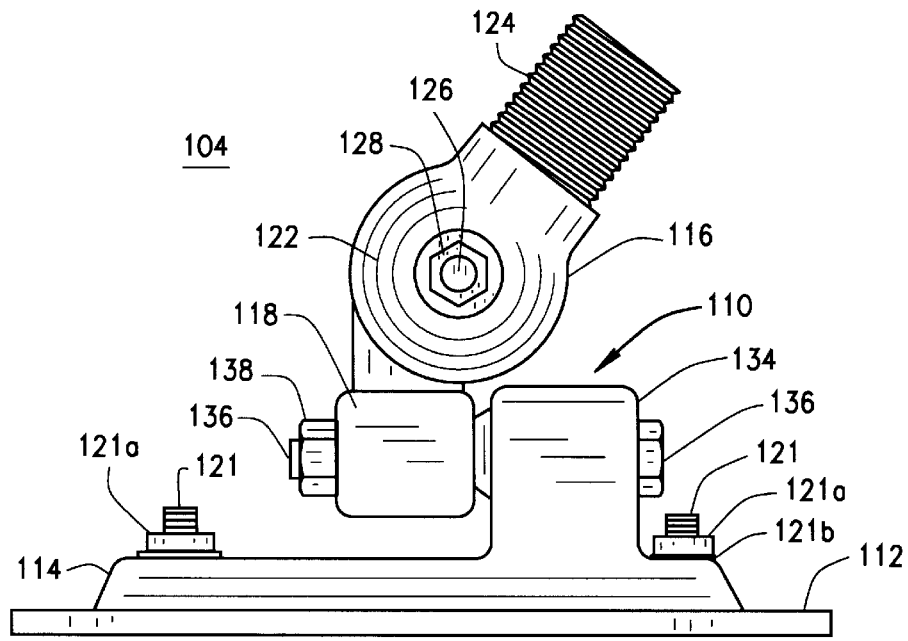
FIG. 2 is a first side elevational view of a mast mount for the trailer alignment apparatus.
Figure 3:
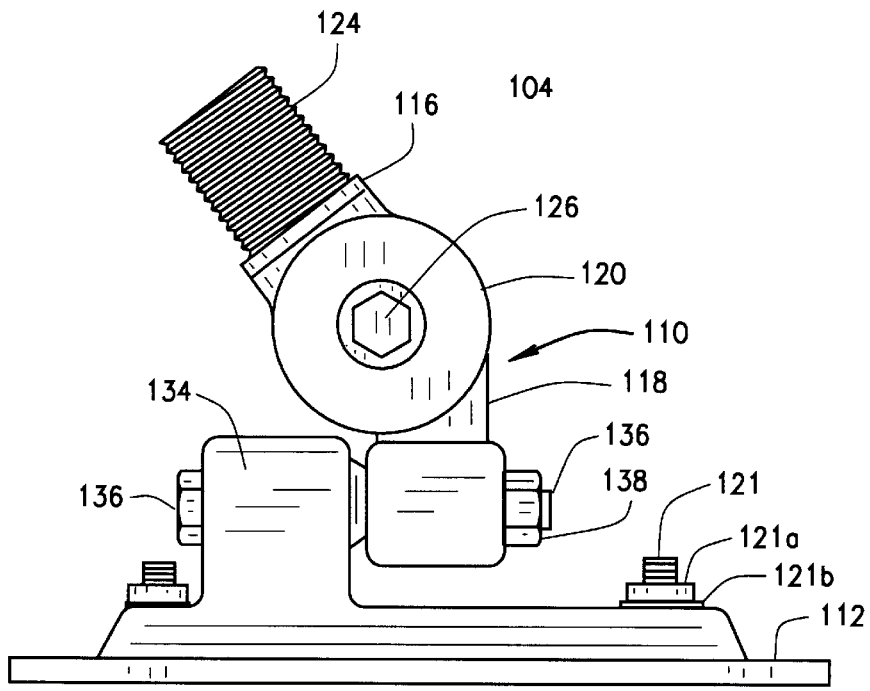
FIG. 3 is a second side elevational view of the mast mount.
Figure 4:
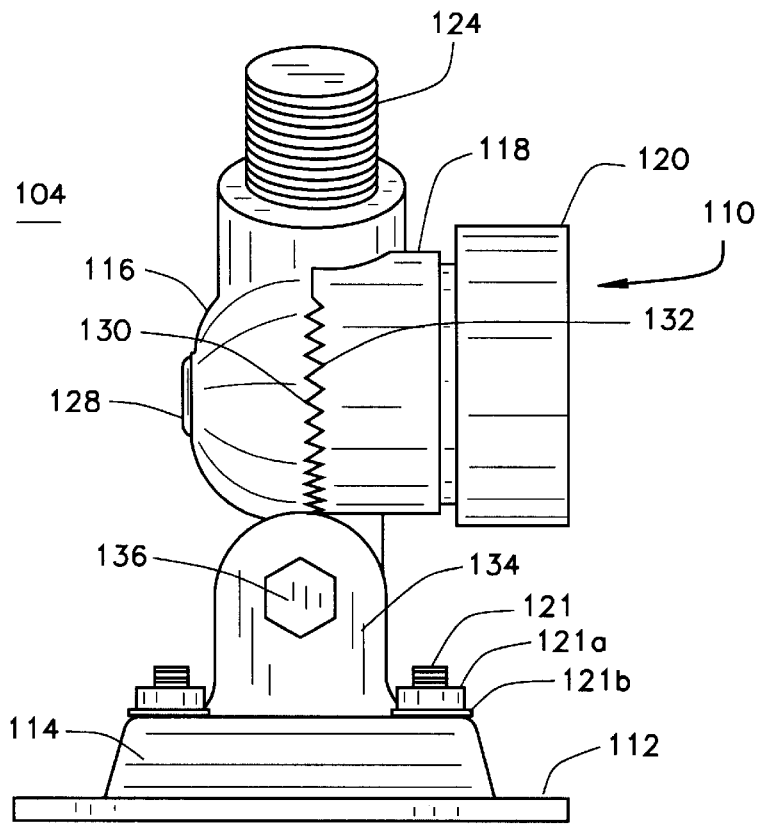
FIG. 4 is a front elevational view of the mast mount.

Referring to FIGS. 2–4, mast mount 104 includes an adjustable mounting portion 110 coupled to a base plate 112. Adjustable mounting portion 110 includes a base portion 114, an adjustable post portion 116, an adjustable middle portion 118, and a locking member 120.

Base plate 112 is a plate fabricated from a durable material such as a molded plastic, wood or metal. In one embodiment, base plate 112 is an oblong plate fabricated of polycarbonate and has at least two openings or holes drilled or molded therethrough (not shown), through which coupling hardware such as bolts, studs or screws (not shown) are inserted. The coupling hardware is used for mounting mast mount 104 to the towing vehicle or trailer. In an alternative embodiment, base plate 112 is secured to winch strut 106 with glue or other adhesive.

In one embodiment, adjustable mounting portion 110 is fabricated by modifying an antenna mount available as Model Number 4186 from the Marine Antennas and Electronics Division of the Shakespeare Company, Newberry, S.C. Adjustable mounting portion 110 is coupled to base plate 112. More specifically, base portion 114 has openings therethrough (not shown) aligned with openings through base plate 112, through which are inserted bolts 121, screws or the like for securing base portion 114 to base plate 112. Bolts 121 are secured, for example, with nuts 121b and washers 121a. Adjustable middle portion 118 is pivotally coupled to base portion 114 as described below. Adjustable post portion 116 is pivotally coupled to one side of adjustable middle portion 118 so that when mast mount 104 is coupled to winch strut 106 as shown in FIG. 1, post portion 116 is pivotally adjustable in a substantially vertical, first adjustment plane which is defined by a substantially vertical axis, and an axis running the length of the trailer or towing vehicle.

More specifically, adjustable post portion 116 includes a substantially circular portion 122 coupled to a post portion 124. In one embodiment, post portion 124 is threaded. Substantially circular portion 122 has a central opening therethrough (not shown) for receiving a bolt 126 which is secured with a nut 128. As shown in FIG. 4, portion 122 has a first teethed surface 130 including substantially triangular teeth arranged in radial orientation on a side of circular portion 122. First teethed surface 130 fits in locking engagement with a second teethed surface 132 on adjustable middle portion 118. A first opening (not shown) through adjustable middle portion 118, for receiving bolt 126, is aligned with the central opening through substantially circular portion 122. Locking member 120 is generally circular in shape with a central opening (not shown) therethrough, the locking member central opening in alignment with the openings through substantially circular portion 122 and adjustable middle portion 118. Bolt 126 thus pivotally couples post portion 116, middle portion 118 and locking member 120 by extending through the aligned openings.

Base portion 114 includes a substantially U-shaped portion 134 having an opening (not shown) therethrough. Adjustable middle portion 118 further has a second opening (not shown) therethrough, the second opening in alignment with the opening through substantially U-shaped portion 134. A second bolt 136 extends through these aligned openings in substantially U-shaped portion 134 and adjustable middle portion 118 and is secured with a nut 138 so that adjustable middle portion 118 is pivotally coupled to base portion 114. Thus, when mast mount 104 is coupled to winch strut 106 as shown in FIG. 1, middle portion 118 is pivotally adjustable relative to base portion 114 in a substantially horizontal, second adjustment plane which is orthonormal to the first adjustment plane defined as described above by the pivotal movement of adjustable post portion 116 relative to adjustable middle portion 118.

Figure 5:
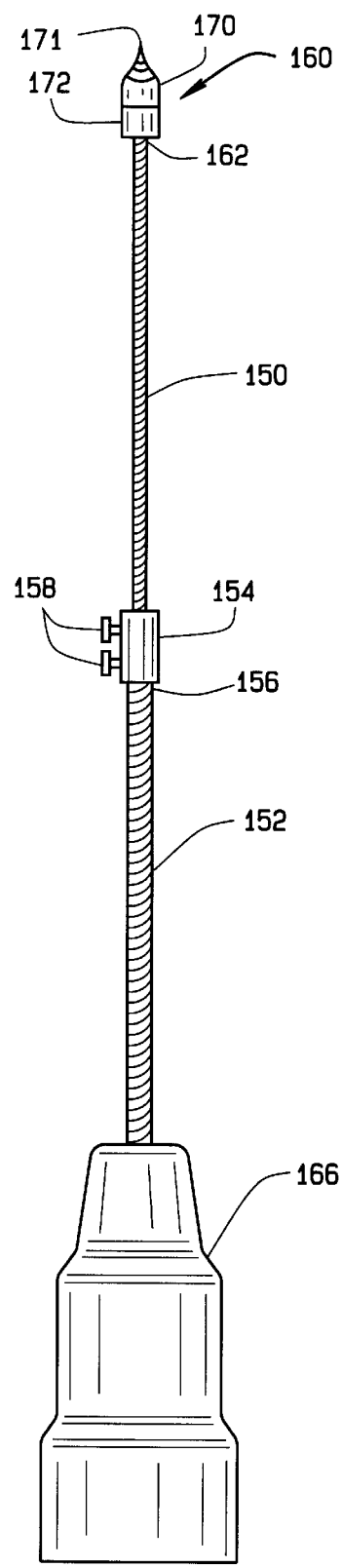
FIG. 5 is an elevational view of a mast for the trailer alignment apparatus.
Figure 6:
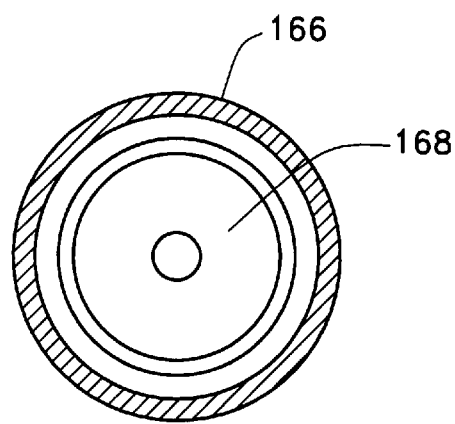
FIG. 6 is a bottom plan view of a socket portion of the mast.

FIG. 5 is an elevational view of mast 102. In one embodiment, mast 102 includes a first hollow mast section 150 and a second hollow mast section 152, wherein first hollow mast section 150 has a slightly smaller diameter in cross section so that first hollow mast section fits in sliding engagement within the hollow core of second hollow mast section 152. Mast sections 150 and 152 are fabricated from, for example, flexible carbon sleeves. Thus, the length of mast 102 is adjustable in telescopic fashion. A mast locking collar 154 is a cylindrical sleeve with a central bore sized to accommodate the diameter in cross-section of second hollow mast section, and is coupled to a first end 156 of second hollow mast section 152. Locking collar 154 has two openings therethrough (not shown), each for receiving a set screw 158. A visual guide 160 is coupled to a first, or free end 162 of mast. A second end 164 of mast 102 is inserted into a mounting portion 166. Mounting portion 166 has a substantially cylindrical, barrel-like or frusto-conical shape, having a hollow portion or socket 168 as shown in FIG. 6 for receiving post portion 124 on adjustable mast mount 104. In one embodiment, the walls of socket 168 are threaded for engagement with a threaded post 124.

In one embodiment, visual guide 160 is a plastic capsule including a top 170 with a translucent tip 171, and a bottom 172 which fit together to form a sealed interior compartment. Tip 171 houses a compact light source such as a bulb or filament, powered by a compact battery (not shown), such as a 3 Volt lithium battery. The battery is held in contact with the light source by a fitting (not shown) on top 170, which holds the battery in one of two positions. A first position holds the battery in contact with the light source so that the light source is powered. A second or storage position holds the battery out of contact with the light source, so that the battery and light source are not used while apparatus 100 is not in use. In an alternative embodiment, visual guide 160 is simply a brightly colored tip fabricated from a flexible material such as rubber, foam or plastic.

Figure 8:
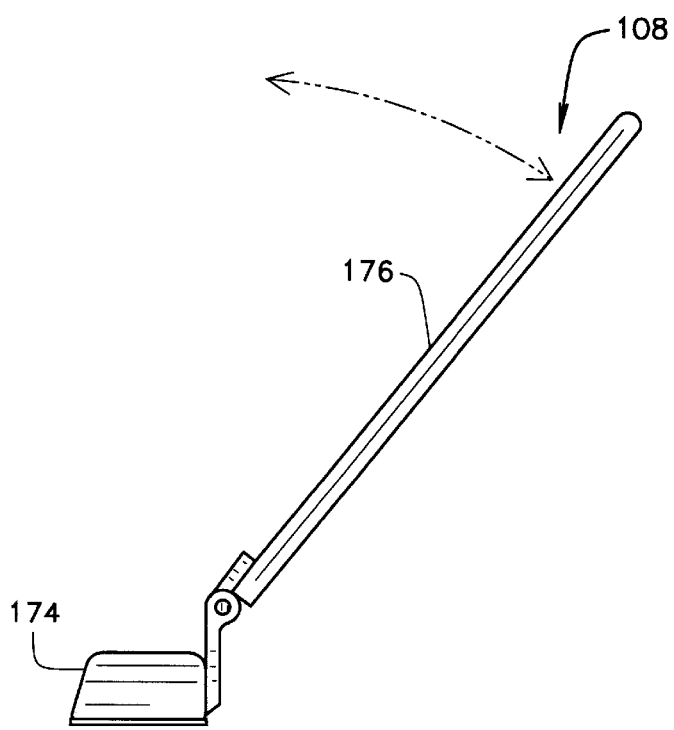
FIG. 8 is a side elevational view of the alignment target.
Figure 7:
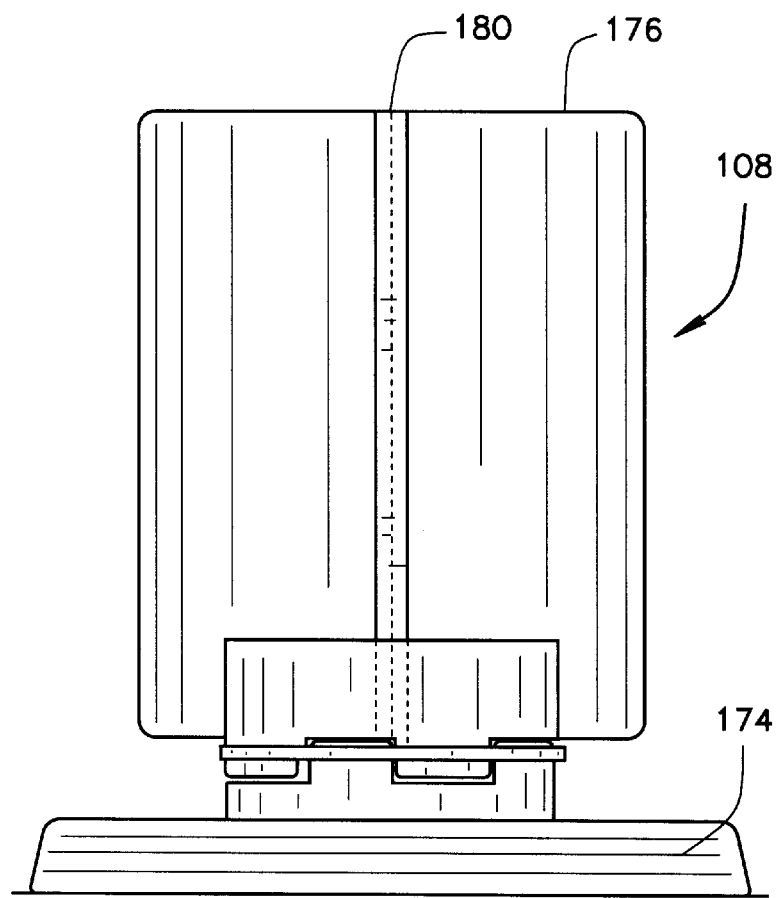
FIG. 7 is a front elevational view of an alignment target for the trailer alignment apparatus.

FIG. 7 is a front elevational view of alignment target 108 for trailer alignment apparatus. Target 108 generally includes a magnetic base member 174, and a transparent target plate 176 coupled to base member 174 with a hinge 178. Target plate 176 and hinge 178 are fabricated, for example, from a rigid, translucent or clear material such as, for example, polycarbonate. In one embodiment, target plate 176 is substantially rectangular in shape, with one of the two short sides coupled to base member 174 by hinge 178. A central alignment indicator 180, such as a score, trough, groove or line, extends along a longitudinal axis defined by the length of plate 176. In an alternative embodiment, target indicator 180 is instead a target symbol in a central position on plate 176. The target symbol is chosen from among common target symbols such as an X, cross-shape, or bulls-eye, or alternatively is a hitch ball outline. The target symbol is imprinted or engraved on plate 176. FIG. 8 is a side elevational view of target 108 showing the pivotal adjustability of plate 108.

In use, apparatus 100 is used to align trailer hitch components on a trailer and a towing vehicle, or similarly to align an object to be towed with a trailer on which the object will be towed. Specifically, in one embodiment, base plate 112, with hardware 121 extending therethrough, is secured to winch strut 106 with glue or other adhesive, or alternatively with hardware such as bolts or studs extending through base plate 112 and strut 106. Adjustable mounting portion 110 is secured to base plate 112 by positioning base portion 114 on base mount and inserting bolts 121 through the openings through base portion 114. Adjustable mounting portion 110 is then secured to base plate 112 with nuts 121a and washers 121b. Of course, the method of adjustable mounting portion 110 to winch strut 106 can be varied. Further, in an alternative embodiment, rather than being secured at the location illustrated in FIG. 1, mast mount 104 is mounted directly on an object to be carried by trailer 101 or at other locations on trailer 101. Alternatively, mast mount 104 is mounted on towing vehicle 109, and target 108 is mounted on the trailer. Mast 102 is then mounted on mast mount 105 by mating socket 168 with post portion 124. In one embodiment, the walls of socket 168 are smooth and socket 168 is sized so that frictional forces between a smooth post portion 124 and socket 168 secure mast mounting portion 166 to mast mount 104. In another embodiment as shown in FIGS. 2–4, post portion 124 is threaded. Socket portion 168 is correspondingly threaded so that the threads on socket portion 168 engage the threads on post portion 124, and mast mounting portion 166 is screwed or twisted onto post portion 124. In either embodiment, mast 102 is easily and quickly secured to and removed from mast mount 104. Target 108 is positioned on a metallic part of the rear of towing vehicle 109, for example on the trunk or tailgate, so that target 108 is visible from the driver's seat. Of course, there are a number of alternative positions for the target on the towing vehicle such that target 108 is visible to the driver. Magnetic base 174 secures target 108 to the towing vehicle, but can be easily removed to adjust the position of target 108 as desired by the towing vehicle driver. Further, the position of plate 176 is angularly adjustable forward and backward relative to the towing vehicle.

Mast mount 104 is then adjusted so that visual guide 160 strikes or contacts target 108 on the rear of towing vehicle 109 when the trailer hitch component on towing vehicle 109 and the hitch component on trailer 101 are aligned with one another. By loosening locking member 120 on mast mount 104, the position of visual guide 160 is adjustable in the first adjustment plane as described above. By loosening bolt 136, the position of visual guide is adjustable in the second adjustable plane as described above. Further, the telescoping configuration of mast sections 150 and 152 allows the position of visual guide 160 to be further adjusted by slidably adjusting the length of mast 102 and locking the length by tightening set screws 158 on locking collar 154. Thus, the position of visual guide 160 has three degrees of freedom. Once the hitch components are in alignment, with visual guide 160 contacting or almost contacting target 108 along central alignment indicator 180, mast mount 104 is left in position while mast 102 is then removed from mount 104 for storage. In one alternative embodiment, the length of mast 102 is marked and then mast 102 is retracted to a shorter length more convenient for traveling. Alternatively, the position of mast mount 104 is marked on trailer 101 and both mast mount 104 and mast 102 are removed to a stowed position so as not to interfere with towing. Target 108 is left in place, or alternatively its position marked, for example with a sticker, and target 108 removed.

When alignment is again desired, the driver may then rely on the preadjusted position of visual guide 160 to direct him from the driver's seat of the towing vehicle while maneuvering the hitch components into alignment. Specifically, if mast mount 104 has been removed, it is moved back to the marked position on trailer 101. If mast 102 has been retracted, it is restored to the previously marked, preadjusted length. Similarly, if target 108 has been removed, it is returned to its previously marked position. Mast 102 is then remounted on mast mount 104. With mast 102 and target 108 in the previously adjusted alignment positions, the driver then brings trailer hitch components into alignment by maneuvering the towing vehicle so that visual guide 160 strikes or nearly strikes target 108 along alignment indicator 180. The transparent target plate 176 allows the driver to track visual guide 160 right up to the moment it strikes or nearly strikes target plate 176. The hinged coupling of target plate 176 to magnetic base 174 is stiff enough to maintain target plate 176 in a substantially upright position as preadjusted by the driver, but also allows target plate 176 to "give" if struck with sufficient force by visual guide 160 during maneuvering, thus reducing the risk of snapping mast 102 during maneuvering for alignment. Thus the driver uses apparatus 100 to track, without exiting the towing vehicle, the alignment of the trailer hitch components. To aid alignment in the dark, the battery in visual guide tip 170 is placed in the contact position to power the light source in tip 171.

In an alternative embodiment of the method of use, mast 102 is positioned in a substantially upright position as shown in FIG. 1 and used during retrieval of boats from water. Typically during retrieval of a boat or other vehicle onto a trailer, the bow of a boat is forced upward at an angle as the boat is guided onto the rear of the trailer from the water. The angling of the bow obscures the view generally of the front of the trailer and in particular of the winch strut 106, and thus makes it difficult for the boat driver to properly align the boat with the trailer. With mast 102 in the substantially upright position, visual guide 160 is readily viewed by the boat driver and is used to align the boat with the trailer. With mast mount 104, mast 102 is easily re-positioned between the substantially horizontal, trailer hitch component alignment position, and the substantially vertical, boat alignment position, both positions as shown in FIG. 1.

Further, the present invention is not limited to the embodiment wherein mast mount 104 is mounted on the trailer. For example, in another embodiment, mast mount 104 is secured to the towing vehicle and target 108 is attached to the trailer. In this embodiment, target 108 and visual guide 160 on mast 102 are again positioned to be visible to the driver from the driver's seat of the towing vehicle. This embodiment of the invention is used in the same way as described above.

The above described apparatus and methods facilitate independent alignment of trailer hitch components and preclude the necessity of repeated exits and reentries of the towing vehicle. In addition, the above described hitch alignment apparatus is simple and adjustable to suit a variety of towing vehicle and trailer hitch configurations. Such apparatus also can be used in the dark, and can also be used to align an object to be towed, such as a boat, with a trailer.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. Apparatus for aligning a trailer hitch component on a towing vehicle having a length, with a hitch component of a trailer, said apparatus comprising:

a mast having a first end and a second end;

a visual guide coupled to said mast first end;

an angularly adjustable mast mount adjustable along a first adjustment plane and a second adjustment plane, said first adjustment plane defined by a substantially vertical axis and an axis running the towing vehicle length, said second adjustment plane defined a substantially vertical plane substantially orthonormal to said first adjustment plane, said mast second end coupled to said angularly adjustable mast mount; and a target for aiming a mast mounted in said mast mount, said target comprising a generally planar transparent surface hingedly coupled to a magnetic base member, said planar transparent surface pivotally adjustable along the first adjustment plane.

2. Apparatus in accordance with claim 1 wherein said mast is removably coupled to said angularly adjustable mast mount.

3. Apparatus in accordance with claim 1 wherein said angularly adjustable mast mount comprises:

a base portion;

an adjustable post portion;

an adjustable middle portion; and a locking member.

4. Apparatus in accordance with claim 3 wherein said adjustable middle portion is pivotally coupled to sad base portion.

5. Apparatus in accordance with claim 4 wherein said adjustable post portion is pivotally coupled to said adjustable middle portion.

6. Apparatus in accordance with claim 5 wherein said locking member is pivotally coupled to said adjustable middle portion.

7. Apparatus in accordance with claim 1 wherein said mast has a length and comprises at least a first mast section and a second mast section, said second mast section in sliding engagement with said first mast section so that the length of said mast is adjustable.

8. Apparatus in accordance with claim 1 wherein said visual guide comprises a light source.

9. Apparatus for aligning a trailer hitch component on a towing vehicle having a length, with a hitch component of a trailer, said apparatus comprising:

a mast having a bottom end and a top end, and a mast mounting portion having a socket coupled to said bottom end;

a mast mount comprising an angularly adjustable post portion for engagement with said mast mounting portion, said angularly adjustable post portion pivotally adjustable in a first adjustment plane and a second adjustment plane, said first adjustment plane substantially orthonormal to said first adjustment plane;

a visual guide coupled to said mast top end; and a target for aiming said mast visual guide, said target comprising a generally planar transparent surface hingedly coupled to a magnetic base member, said planar transparent surface pivotally adjustable along the first adjustment plane.

10. Trailer hitch alignment apparatus comprising:

a mast mount comprising an angularly adjustable threaded post portion for coupling to a first end of a mast, said post portion coupled to a base plate configured to secure said mast mount to one of a towing vehicle or a trailer, said threaded post portion pivotally adjustable in at least a substantially vertical first adjustment plane and a substantially vertical second adjustment plane, said first adjustment plane substantially orthonormal to said second adjustment plane; and an angularly adjustable target comprising a substantially planar surface hingedly coupled to a magnetic base member, said target pivotally adjustable in the first adjustment plane.

11. A method for aligning a trailer hitch component on a towing vehicle with a complementary trailer hitch component on a trailer, said method comprising the steps of:

mounting an angularly adjustable mast mount for mounting a mast on one of the towing vehicle and the trailer, wherein the angularly adjustable mast mount includes a threaded post portion that is pivotally adjustable in a first, substantially vertical adjustment plane and a second substantially vertical adjustment plane, the first adjustment plane substantially orthonormal to the second adjustment plane;

mounting an angularly adjustable target on the other of the towing vehicle and the trailer so that the target is visible to a driver of the towing vehicle, wherein the angularly adjustable target is pivotally adjustable in one of the first adjustment plane and the second adjustment plane; and pre-adjusting the threaded post portion of the mast mount in the first adjustment plane and the second adjustment plane, and the target in one of the first adjustment plane and the second adjustment plane, so that a visual guide on a mast coupled to the mast mount post portion contacts the target when the hitch component of the trailer and the hitch component of the towing vehicle are aligned.

* * * * *